United States Patent
Giuntini (10) Patent No.: US 9,425,650 B2
(45) Date of Patent: Aug. 23, 2016

(54) SYSTEMS, METHODS, AND DEVICES FOR CONTROL OF MULTIMODE UPS

(75) Inventor: Lorenzo Giuntini, Ticino (CH)

(73) Assignee: General Electric Company, Schenectady, NY (US)

( * ) Notice: Subject to any disclaimer, the term of this patent is extended or adjusted under 35 U.S.C. 154(b) by 1074 days.

(21) Appl. No.: 13/363,172

(22) Filed: Jan. 31, 2012

(65) Prior Publication Data

US 2013/0193759 A1 Aug. 1, 2013

(51) Int. Cl.
*H02J 9/00* (2006.01)
*H02J 9/06* (2006.01)
*H02J 3/00* (2006.01)

(52) U.S. Cl.
CPC ............... *H02J 9/062* (2013.01); *H02J 9/061* (2013.01); *H02J 2003/001* (2013.01); *H02J 2009/068* (2013.01); *Y04S 20/12* (2013.01); *Y04S 20/248* (2013.01); *Y10T 307/615* (2015.04)

(58) Field of Classification Search
CPC ..... H02J 9/062; H02J 9/061; H02J 2009/068; H02J 2003/001; Y04S 20/248; Y04S 20/12; Y10T 307/615
See application file for complete search history.

(56) References Cited

U.S. PATENT DOCUMENTS

| | | | | |
|---|---|---|---|---|
| 6,304,006 B1 * | 10/2001 | Jungreis | ............... | H02J 3/38 307/64 |
| 6,906,933 B2 * | 6/2005 | Taimela | ............... | H02J 3/62 363/34 |
| 7,061,141 B2 * | 6/2006 | Yamamoto | ............ | H02J 3/46 307/65 |
| 7,265,458 B2 * | 9/2007 | Edelen | ............... | H02J 9/06 307/65 |
| 7,372,177 B2 | 5/2008 | Colombi et al. | | |
| 7,566,988 B2 * | 7/2009 | Heber | ............... | H02J 9/062 307/44 |
| 8,212,404 B2 * | 7/2012 | Zajkowski | .......... | H02J 9/061 307/64 |
| 8,362,647 B2 * | 1/2013 | Anderson | ............ | H02J 9/04 307/64 |
| 9,013,063 B2 * | 4/2015 | Sato | ................... | H02J 9/062 307/64 |
| 9,160,202 B2 * | 10/2015 | Colombi | ............ | H02J 3/006 |
| 2003/0004780 A1 | 1/2003 | Smith et al. | | |
| 2006/0221523 A1 * | 10/2006 | Colombi | ............ | H02J 9/062 361/90 |
| 2011/0101779 A1 * | 5/2011 | Patel | ................... | H02J 3/28 307/64 |
| 2012/0074786 A1 * | 3/2012 | Johnson, Jr. | ......... | H02J 9/062 307/66 |
| 2012/0169125 A1 * | 7/2012 | Bobb | ................... | H02J 9/062 307/64 |

OTHER PUBLICATIONS http://powerquality.eaton.com/About-Us/News-Events/2009/PRO51009.asp; Date: Oct. 5, 2009 Eaton's Energy Saver System Enables UPSs to Deliver Industry-leading Efficiency without Compromising Reliability.

* cited by examiner

*Primary Examiner* — Daniel Cavallari
(74) *Attorney, Agent, or Firm* — Fletcher Yoder, P.C.

(57) ABSTRACT

Systems and methods are provided to control a multimode uninterruptible power supply (UPS) using external information relevant to the stability of the power source. In one example, a UPS system may include at least one inverter feed path and at least one bypass feed path. A controller may command the inverter feed path and the bypass feed path based at least in part on information relevant to the stability of the power source that supplies the first inverter feed path or the first bypass feed path, or both. This information relevant to the stability of the power source may derive from at least one information provider external to the UPS system.

19 Claims, 4 Drawing Sheets

SYSTEMS, METHODS, AND DEVICES FOR CONTROL OF MULTIMODE UPS

BACKGROUND

The presently disclosed subject matter relates to control of uninterruptible power supplies (UPSs).

An uninterruptible power supply (UPS) is an electrical device that can supply power to a load despite variations in quality and/or availability of utility-based power. One common type of UPS is a double-conversion UPS. A double-conversion UPS receives power from a power source (typically a utility power grid), converts the power from alternating current (AC) to direct current (DC) in a rectifier, and stores at least some of this power in an energy storage device. An inverter changes the DC power from the rectifier and/or the energy storage device into an AC power waveform. The AC power waveform may be supplied to the load.

Because multiple-conversion operation can be relatively inefficient, many UPS devices can operate in an alternative mode to improve efficiency. In one power-saving mode, power to the load may be supplied primarily through a bypass feed path from the utility to the load. In this power-saving mode, power will only be supplied via double-conversion when the utility power supply is disturbed. While such power-saving modes may be more efficient, when disturbances to the utility power supply occur, they could disrupt power to the load. Moreover, decisions as to which mode the UPS should be operated in may be reactive, occurring only after electrical measurements indicate a power supply disturbance has occurred.

BRIEF DESCRIPTION OF THE INVENTION

Certain embodiments commensurate in scope with the originally claimed invention are summarized below. These embodiments are not intended to limit the scope of the claimed invention, but rather these embodiments are intended only to provide a brief summary of possible forms of the invention. Indeed, the invention may encompass a variety of forms that may be similar to or different from the embodiments set forth below.

In a first embodiment, an uninterruptible power supply (UPS) system may include at least one inverter feed path and at least one bypass feed path. A controller may command the inverter feed path and the bypass feed path based at least in part on information relevant to the stability of the power source that supplies the first inverter feed path or the first bypass feed path, or both. This information relevant to the stability of the power source may derive from at least one information provider external to the UPS system.

In a second embodiment, an article of manufacture may include one or more tangible, machine-readable media at least collectively storing machine-executable instructions. The instructions may include instructions to receive information relevant to a stability of a power source that supplies power to at least one uninterruptible power supply (UPS). This information relevant to the stability of the power source may derive from at least one information provider located off-site from the at least one UPS. The instructions may also include instructions to estimate a likelihood of a power supply disturbance using the information relevant to the stability of the power source. The instructions may further include instructions to cause the at least one UPS to operate in a more protective mode when the likelihood of the power supply disturbance exceeds an allowable likelihood.

In a third embodiment, a method for controlling a multimode uninterruptible power supply (UPS) that receives power from a power grid may include causing the UPS to operate in a first mode or in a second mode, more protective than the first mode. The UPS may be operated in the first mode when information relevant to the stability of the power grid—deriving from at least one information provider remote from the UPS—indicates a relatively lower likelihood of disturbances. The UPS may be operated in the second mode when the information relevant to the stability of the power grid indicates a relatively higher likelihood of disturbances.

BRIEF DESCRIPTION OF THE DRAWINGS

These and other features, aspects, and advantages of the present invention will become better understood when the following detailed description is read with reference to the accompanying drawings in which like characters represent like parts throughout the drawings, wherein.

DETAILED DESCRIPTION OF THE INVENTION

One or more specific embodiments of the present invention will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present invention, the articles "a," "an," "the," and "said" are intended to mean that there are one or more of the elements. The terms "comprising," "including," and "having" are intended to be inclusive and mean that there may be additional elements other than the listed elements.

The present disclosure relates to controlling at least one multimode uninterruptible power supply (UPS) using information relevant to the power source supplying the UPS from an external source. As mentioned above, a UPS may provide power to a load while protecting the load from supply disturbances. A multimode UPS can operate in more than one mode—typically at least one mode that provides more certain protection and at least one mode that provides more efficiency. In a double-conversion mode, alternating current (AC) power is first converted to direct current (DC) before being reconverted back to AC in an inverter feed path. In such a double-conversion mode, the UPS may provide excellent protection but limited efficiency. In a more efficient mode (e.g., an "eco-mode"), power is usually provided through a bypass feed path unless a power supply disturbance occurs. When a power supply disturbance occurs, power is then provided through the inverter feed path. This more efficient mode may provide greater efficiency, but may offer less certain protection. The present disclosure will describe a manner of UPS control that can proactively determine when to operate in which mode.

Namely, the presently disclosed system of UPS control may not merely determine whether to supply power through the bypass feed path or through the inverter feed path based exclusively on electrical measurements through the UPS. Indeed, such electrical measurements may be used to verify that a power supply disturbance has occurred. Relying exclusively on such electrical measurements, however, could leave the UPS unprepared for a power supply disturbance when external events make power supply disturbances more likely. Thus, the presently disclosed UPS control system may make certain operating decisions using external information relevant to the stability of the power source.

As will be discussed further below, external events such as severe weather events could impact the stability of the power grid. Hurricanes, tornados, ice storms, and/or thunderstorms, for instance, could increase the likelihood of a power supply disturbance—or the likelihood that minor anomalies in the electrical measurements may foreshadow more severe power supply disturbances. Other events, such as a scheduled grid outage or sudden unexpected demand, or current events such as strikes or riots, could also indicate a higher likelihood of instability.

The presently disclosed UPS control system may adjust its operation based at least partly on such external information relevant to the stability of the power source. For example, when this information indicates a sufficiently high likelihood of power supply disturbances, the UPS may be controlled to operate in a more protective mode. Such a more protective mode may include, for example, a mode in which more power is supplied through the inverter feed path than through the bypass feed path. Additionally or alternatively, operating in such a more protective mode may involve reacting more swiftly to anomalies in the electrical measurements of the UPS. When the external information suggests a higher likelihood of disturbances, for example, a threshold to identify a power supply disturbance may be lower than otherwise.

Figure 1:
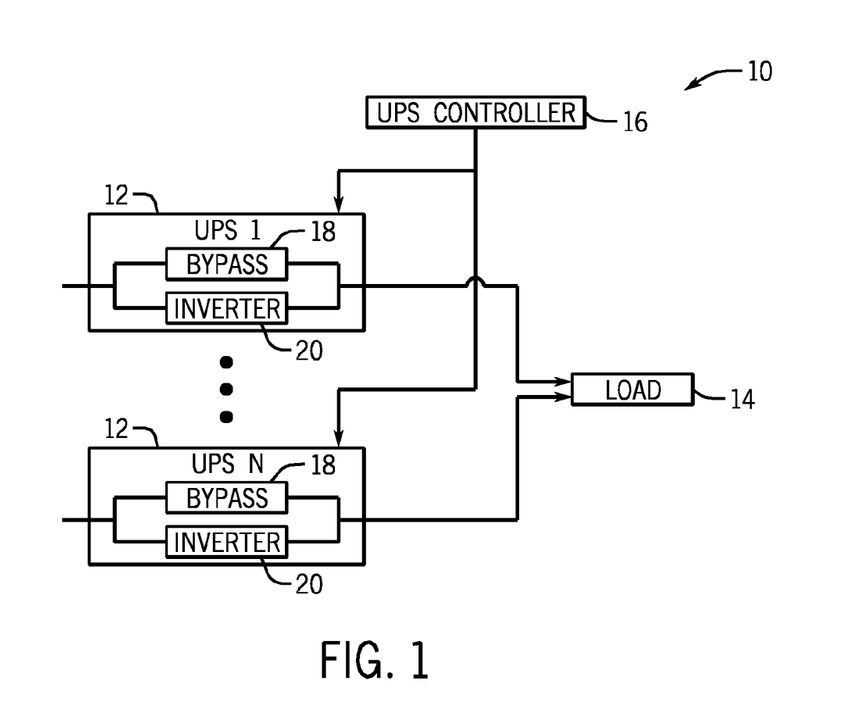
FIG. 1 is a block diagram of a parallel uninterruptible power supply (UPS) system, in accordance with an embodiment.

One example of a parallel uninterruptible power supply (UPS) system 10 that may employ such control techniques appears in FIG. 1. The parallel UPS system 10 includes any suitable number of uninterruptible power supplies (UPSs) 12, here labeled 1 . . . N, to feed power to a load 14. One or more UPS controllers 16 may control the operation of the UPSs 12 in the manner described below. Although the example of FIG. 1 illustrates a single UPS controller 16 that may control all of the UPSs 12 of the parallel UPS system 10, other configurations may be employed. For example, each UPS 12 may alternatively rely on its own UPS controller 16, which may coordinate with other UPS controllers 16 in any suitable fashion (e.g., peer-to-peer or master-slave).

Among other things, the UPS controller 16 may determine and control when each UPS 12 supplies power to the load 14 by way of a bypass feed path 18 or an inverter feed path 20. The bypass feed path 18 of each UPS 12 represents power supplied from some main power source, such as a power utility or local generator. In contrast, the inverter feed path 20 represents a double-conversion path in which alternating current (AC) power is first converted to direct current (DC) before being converted again to AC power using an inverter. In the example of FIG. 1, the inverter feed path 20 receives power from the same power source as the bypass feed path 18. It should be appreciated, however, that the inverter feed path 20 may alternatively receive input power from a different power source. For instance, the bypass feed path 18 may receive power from a utility power grid and the inverter feed path 20 may receive power from a local generator. The inverter feed path 20 will generally provide a higher-quality source of power that is resistant to disturbances from the power grid. Supplying power through the inverter feed path 20, however, will introduce some inefficiencies due to power conversion. As such, supplying power through the inverter feed path 20 may be less efficient than supplying power through the bypass feed path 18.

In general, then, the UPS controller 16 may control the bypass feed path 18 to supply power to the load 14 as a default. When certain power supply disturbances occur or are likely to occur, the UPS controller 16 may cause one or all of the UPSs 12 to transition from supplying power via bypass feed paths 18 to supplying power via inverter feed paths 20. When the power supply disturbance is no longer occurring (and/or is not expected to occur for some period of time in the future), the UPS controller 16 may cause the UPS 12 to transition from the inverter feed path 20 back to the bypass feed path 18.

Figure 2:
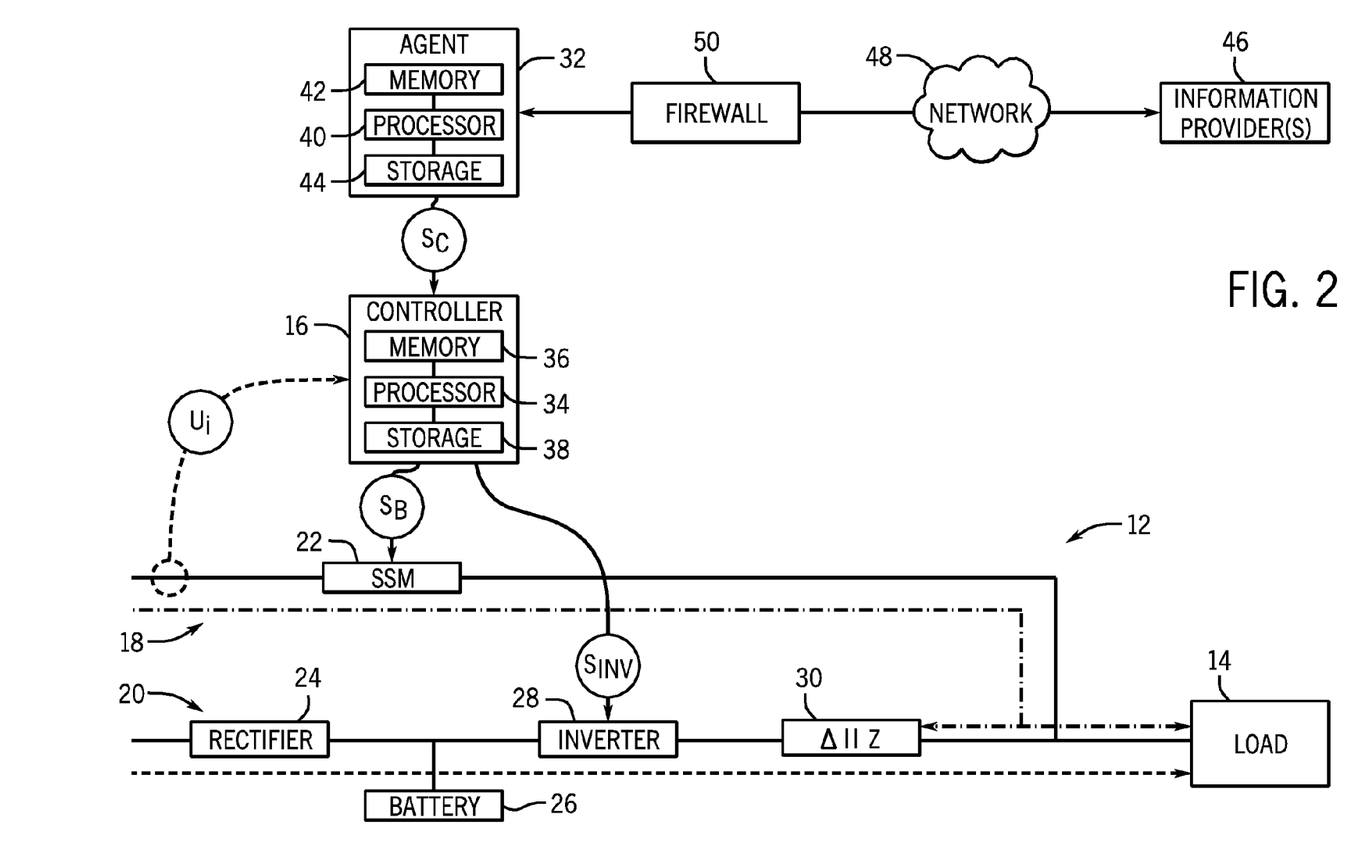
FIG. 2 is a block diagram illustrating a system for controlling a UPS using external information relevant to a power source, in accordance with an embodiment.

The controller 16 may control the bypass feed path 18 and the inverter feed path 20 of a UPS 12 in a manner that varies depending on information relevant to the stability of the power source to the UPS 12 (e.g., the stability of the power grid). As shown in FIG. 2, various components of a UPS 12 may be controlled by the controller 16. It should be appreciated that the example of FIG. 2 represents a simplified block diagram and that the UPS controller 16 may receive more electrical measurements and may issue more control signals as desired.

As shown in FIG. 2, the bypass feed path 18 may include a static switch module (SSM) 22 that may be switched on or off by a control signal $S_B$. The inverter feed path 20 may include a rectifier 24, a battery 26, and inverter 28, and/or an output transformer 30. The rectifier 24 may convert alternating current (AC) power from any suitable power source into direct current (DC) power, some of which may be stored in the battery 26 or any other suitable energy storage device. The inverter 28 may convert the DC power from the battery 26 and/or the rectifier 24 to generate an AC power waveform received by the output transformer 30 and provided to the load 14 when so commanded by the controller 16 via a control signal $S_{INV}$. The control signal $S_{INV}$ may represent a number of individual switching signals that cause the inverter 28 to transform DC power into AC power. In general, the controller 16 may issue control signals $S_B$ to cause the bypass feed path 18 to provide power to the load 14 when power supply disturbances are not occurring or are sufficiently unlikely. Some of this power may back-feed into the inverter feed path 20 to keep the output transformer 30 magnetized. The controller 16 generally may cause the inverter feed path 20, which is less efficient than the bypass feed path 18, not to supply power to the load 14 unless a power supply disturbance is occurring or is sufficiently likely to occur.

The controller 16 may determine whether a power supply disturbance is occurring or is likely to occur in at least one of two ways. First, the controller 16 may receive electrical measurements in the UPS 12, such as an input voltage measurement $U_i$ (where the term i denotes a first, second, or third phase of three-phase input power). It should be understood that any suitable electrical measurements in the UPS 12 may be obtained—the input voltage measurement $U_i$ is provided as only one non-limiting example. Anomalies in the electrical measurements in the UPS 12 may indicate a power supply disturbance. Second, the controller 16 may receive a control signal $S_c$ from an agent 32. As will be described below, the agent 32 may generate the control signal $S_c$ based on external information relevant to the stability of the power source.

The control signal $S_c$ may cause the controller 16 to operate in a more protective mode. By way of example, the controller 16 may cause the bypass feed path 18 to supply less power to the load 14 and/or to cause the inverter feed path 20 to supply more or all of the power to the load 14. In another example, the controller 16 may identify power supply disturbances based on lower thresholds of variations in the electrical measurements (e.g., $U_i$) on the UPS 12. That is, the electrical measurements (e.g., $U_i$) on the UPS 12 may be evaluated according to first thresholds when the control signal $S_c$ is not being provided or when the control signal $S_c$ does not indicate a power supply disturbance is likely. When the control signal $S_c$ is being provided and/or when the control signal $S_c$ does indicate a power supply disturbance is likely, the electrical measurements (e.g., $U_i$) on the UPS 12 may be evaluated according to second thresholds. The second thresholds may be lower than the first thresholds to increase sensitivity to power supply disturbances when power supply disturbances are more likely.

In the example of FIG. 2, the controller 16 and the agent 32 are illustrated as separate devices that may communicate with one another locally. For example, the controller 16 may be a component of the UPS 12, and the agent 32 may be a computer or other suitable electronic device. The agent 32 may be connected to the controller 16 using any suitable communication (e.g., an RS-232 serial connection). Additionally or alternatively, the agent 32 may be a component of the controller 16. Moreover, in some embodiments, the actions described as taken by the agent 32 in this disclosure may instead be carried out by the controller 16. In another example, the agent 32 may be a component of a network interface of the controller 16 (e.g., a network adapter module that can be added into the controller 16).

In the example of FIG. 2, the controller 16 may employ a processor 34 operably coupled to memory 36 and/or storage 38. The agent 32 may employ a processor 40 operably coupled to memory 42 and/or storage 44. The processors 36 and 40 and/or other data processing circuitry may carry out instructions stored on any suitable article of manufacture having one or more tangible, machine-readable media at least collectively storing such instructions. The memory 36 and 42 and/or storage 38 and 44 may represent such articles of manufacture. Among other things, the memory 36 and 42 and/or the storage 38 and 44 may represent random-access memory, read-only memory, rewriteable memory, a hard drive, or optical discs. Additionally or alternatively, the UPS controller 16 may include a field programmable gate array (FPGA) or an application-specific integrated circuit (ASIC) that has been programmed to carry out the techniques discussed herein or to support the processor 40 (e.g., by assisting in communication).

The agent 32 may receive information relevant to the stability of the power source supplying the UPS 12 from one or more information provider(s) 46. The information provider(s) may be, for example, a weather service, a news service, a utility provider, or any other suitable source of information relevant to the stability of the power source. This information may be provided across a network 48, such as the Internet, passing through a firewall 50 to reach the agent 32. This connection could be wired Ethernet, a wireless connection, through an analog modem or GPRS terminals, and/or an Ethernet-based LAN, or any suitable means of communication.

Figure 3:
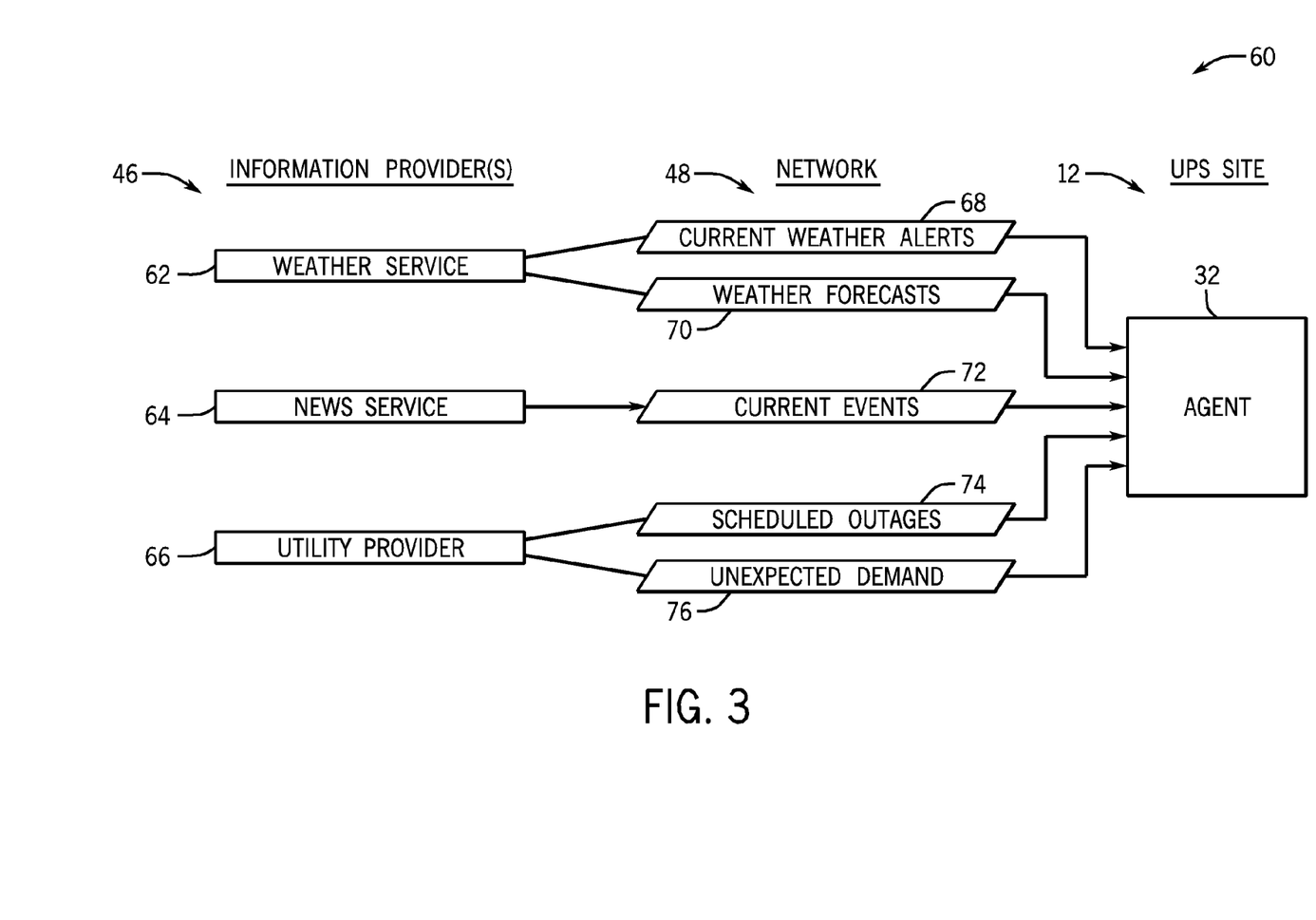
FIG. 3 is a communication diagram showing information relevant to the stability of the power source communicated from information provider(s) to an agent associated with the UPS system, in accordance with an embodiment.

FIG. 3 provides an example of suitable communication that may take place between the agent 32 and the information provider(s) 46. In the example of FIG. 3, a communication diagram 60 illustrates data provided by various information providers 46. These information providers 46 include a weather service 62, a news service 64 and a utility provider 66. The information providers 46 may provide various messages 68, 70, 72, 74, and 76 via the network 48 to the agent 32. By way of example, the agent 32 may receive one or more of the messages 68, 70, 72, 74, and/or 76 using a hypertext transfer protocol (HTTP) based mechanism, such as really simple syndication (RSS).

One advantage of using HTTP is the widespread use of the protocol. Notably, most organizations allow access to external services via HTTP. Thus, the agent 32 may be introduced into a customer network without great changes to firewall settings and/or security policy. The agent 32 may perform its HTTP access either directly or through a proxy, if such a mechanism is enforced on a customer network. A secure protocol such as HTTP over Secure Socket Layer (SSL) (known as HTTPS) may be employed to provide encryption for added confidentially. Moreover, RSS feeds over HTTP or HTTPS provide data in the XML (eXtensible Markup Language) format. The agent 32 may easily parse and locate the relevant information in the XML format in the messages 68, 70, 72, 74, and/or 76. Variations and other implementations may also be pursued. For instance, the agent 32 may retrieve the messages 68, 70, 72, 74, and/or 76 via Atom syndication, Simple Object Access Protocol (SOAP), and/or Asynchronous JavaScript and XML (Ajax). The agent may retrieve the messages 68, 70, 72, 74, and/or 76 via an application layer other than HTTP, such as SOAP over simple mail transfer protocol (SMTP), or via other suitable web services. Furthermore, the messages 68, 70, 72, 74, and/or 76 may be provided as text-based representations (e.g., XML, plain text, or JavaScript Object and Notation (JSON)), binary data, or other encoded data.

As seen in FIG. 3, the messages 68, 70, 72, 74, and/or 76 may provide a variety of types of external information relevant to the stability of the power source to the UPS 12. The messages 68, 70, 72, 74, and/or 76 are merely intended to provide a few examples of external information relevant to the stability of the power source. The messages 68, 70, 72, 74, and/or 76 are not be exhaustive. Furthermore, while the communication diagram 60 of FIG. 3 depicts several information provider(s) 46, in other embodiments, more or fewer information provider(s) 46 may be used. For instance, a single information provider 46 may provide a service that aggregates information from other sources. In another example, a single information provider 46 may provide a service that does not expressly provide to the agent 32 the information relevant to the stability of the power source. Instead, in some embodiments, such a single information provider 46 may provide a likelihood of power source instability as generally described as determined by the agent 32 below.

Some information that may be relevant to the stability of the power source to the UPS 12 may be current weather alerts 68 and/or weather forecast 70 in the geographic area of the power source to the UPS 12. In one example, the agent 32 may define the geographic area at which the UPS 12 is located with a unique and/or non-repetitive identification number. The weather service 62 may provide appropriate weather alerts 68 and/or weather forecast 70 in response. Additionally or alternatively, this geographic location information may be identified using postcodes, a location name, latitude and longitude coordinates, or other suitable geographic indicators. The current weather alerts 68 and/or the weather forecast 70 may be tailored particularly to the geographic area associated with the UPS 12. By way of example, weather conditions and forecasts provided by the current weather alerts 68 and/or weather forecast 70 may be assigned a numeric code that identifies certain severe weather conditions (e.g., tornadoes, hurricanes, ice storms, blizzards, and so forth). Additionally or alternatively, this same information could be provided using text-based strings or any other suitable representation that may be parsed by the agent 32. As should be appreciated, indications of severe weather around the geographical location of the UPS 12 may indicate a greater likelihood of power supply disturbances to the UPS 12.

Other types of information that may be relevant to the stability of the power source to the UPS 12 may be an indication of current events 72, which may be provided by a news service 64. For instance, strikes, riots, fires, and other events may be reported to the agent 32. These types of current events 72 may indicate an increased likelihood of a disturbance of the power source to the UPS 12.

In some cases, the utility provider 66 may provide external information relevant to the stability of the power source. For example, the utility provider 66 may provide an indication of scheduled outages 74 and/or unexpected demand 76 on its power grid. As should be understood, the indication of scheduled outages 74 may be used by the agent 32 to identify a potential loss of power from the power grid. Likewise, the indication of unexpected demand 76 may represent an increased likelihood of a loss of stability.

The agent 32 and/or the controller 16 may determine to modify the operation of the UPS 12 depending on the information relevant to the stability of the power source to the UPS 12. For example, as illustrated in a flowchart 90 of FIG. 4, the agent 32 and/or controller 16 may receive such information from the information provider(s) 46 (block 92). With this information, the agent 32 and/or controller 16 may weigh the likelihood of a power supply disturbance to the power source to the UPS 12 (block 94). For example, depending on the occurrence and/or type of severe weather, current events, or utility power grid information, the agent 32 and/or the controller 16 may ascertain a numerical representation of a likelihood of a power supply disturbance given such information. When the determined likelihood of a power supply disturbance exceeds some threshold (decision block 96), the agent 32 and/or controller 16 may ascertain that the controller 16 should operate in a higher-protection mode (block 98).

Figure 4:
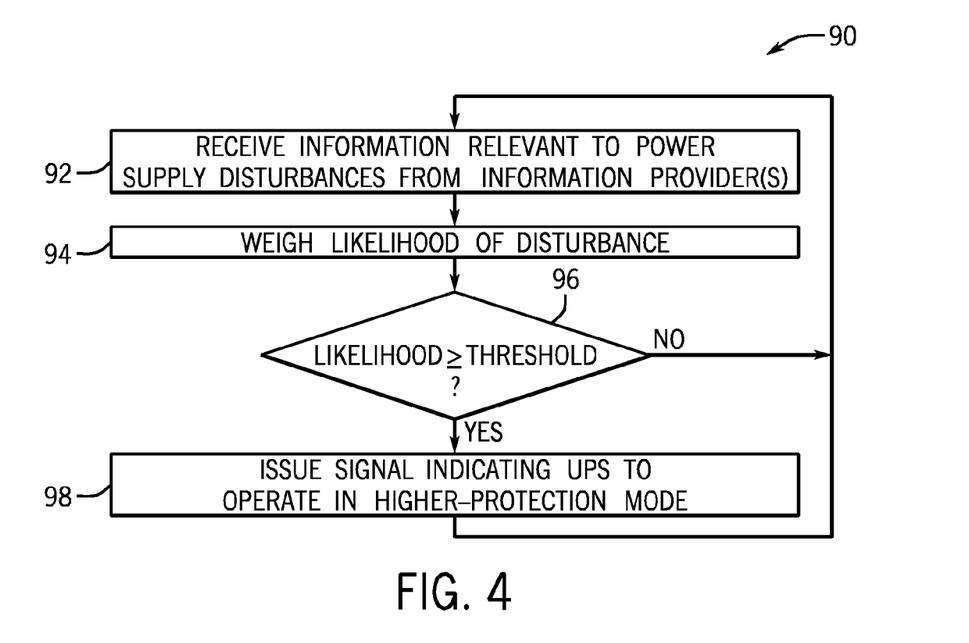
FIG. 4 is a flowchart of a method for controlling the UPS system based at using the information relevant to the power source, in accordance with an embodiment.

In one example, at block 98, the agent 32 may issue the control signal $S_c$ to the controller 16 after determining that a power supply disturbance is sufficiently likely. In response, the controller 16 may cause the bypass feed path 18 to supply less power to the load 14 and the inverter feed path 20 to supply more power to the load 14. In some embodiments, when the agent 32 supplies the control signal $S_c$ to the controller 16, the controller 16 may cause the inverter feed path 20 to supply substantially all of share of power to the load 14 and the bypass feed path 18 to supply substantially none of the share of the power to the load 14.

In another example, when the agent 32 provides the control signal $S_c$ to the controller 16, the controller 16 may modify its reaction to the electrical measurements of the UPS 12. For instance, when the controller 16 has not received the control signal $S_c$ from the agent 32 in some amount of time—indicating a relatively lower likelihood of power supply disturbances—the controller 16 may identify a power supply disturbance when the electrical measurements (e.g., $U_t$) exceed a first threshold. When the agent 32 supplies the control signal $S_c$—indicating a relatively higher likelihood of power supply disturbances—the controller 16 may identify a power supply disturbance when the electrical measurements of the UPS 12 (e.g., $U_t$) exceed a second, lower, threshold instead.

In still other examples, at block 98, the controller 16 may decide to enter the more protective mode of operation on its own. Additionally or alternatively, rather than provide the information relevant to power supply disturbances, an information provider 46 may determine and provide the likelihood of a power supply disturbance or even a representation of the control signal $S_c$. That is, in one example, an information provider 46 may perform the analysis of blocks 92 and 94. Thereafter, the information provider 46 may provide the agent 32 and/or the controller 16 with an indication of the likelihood of a power supply disturbance. In another example, an information provider 46 may perform the analysis of blocks 92, 94, 96, and 98, providing an indication such as the control signal $S_c$ when appropriate.

After switching to a more protective mode of operation of the UPS 12, the external information relevant to power supply disturbances may also be used to determine when to return to a more efficient, but less protective, mode of operation. For example, as shown by flowchart 100 of FIG. 5, the information relevant to power supply disturbances may be used to determine whether to stay in a more protective mode for a longer period of time than first set. The flowchart 100 may begin when the UPS 12 switches to operate in a more protective mode (block 102). The UPS controller 16 and/or the agent 32 may set some time delay during which to continue to operate in the more protective mode (block 104). The agent 32 and/or UPS controller 16 may continue to receive the information relevant to power supply disturbances from the information provider(s) 46 (block 106). Thereafter, the agent 32 and/or UPS controller 16 may weigh the likelihood of such a power supply disturbance (block 108).

Figure 5:
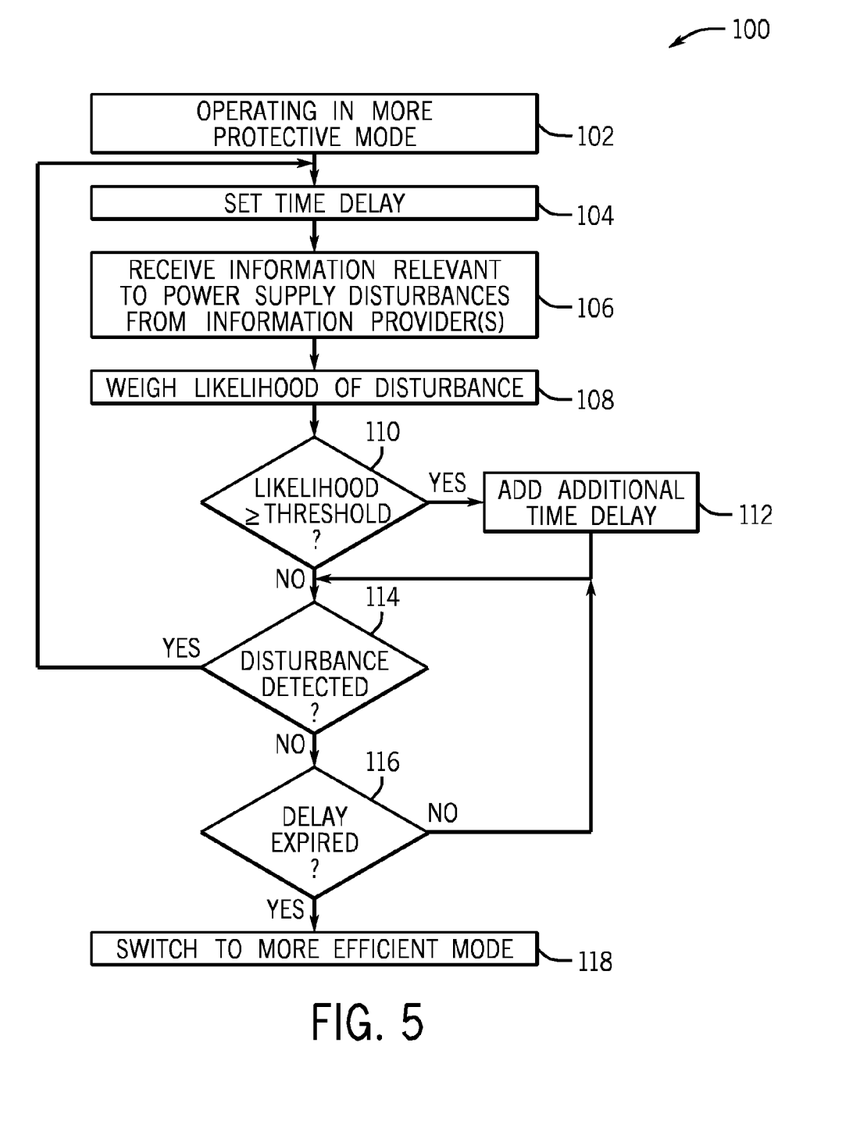
FIG. 5 is a flowchart of a method for controlling the UPS system to operate in a protective mode of operation, in accordance with an embodiment.

If the likelihood of a power supply disturbance determined by the agent 32 and/or UPS controller 16 exceeds some threshold (decision block 110), additional time delay may be added to the original time delay set at block 104 (block 112). Thereafter, or otherwise, as long as no new disturbance is detected (decision block 114), the agent 32 and/or UPS controller 16 may wait until the delay has expired (decision block 116) before switching to a more efficient mode (block 118). Thus, if a disturbance is detected (decision block 114) before the delay has expired (decision block 116), the process may return to block 104 and the time delay may be reset. Likewise, until the delay has expired (decision block 116), the process may return to determining whether or not a disturbance is detected (decision block 114).

Technical effects of the present disclosure include improved protection for a load supplied with power from an uninterruptable power supply (UPS). Specifically, by monitoring external information relevant to stability of a power source to the UPS, power supply disturbances may be more readily identified or anticipated. The UPS may operate in a higher-protective mode when a power supply disturbance is determined to be more likely using such information relevant to the stability of the power source to the UPS. For instance, the UPS may be controlled to operate in a more protective mode during periods of severe weather around the geographical location of the site where the UPS is located.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

The invention claimed is:

1. An uninterruptible power supply (UPS) system comprising:
    a first inverter feed path comprising a rectifier in series with an inverter to supply a first amount of power to a load based at least in part on a first command;
    a first bypass feed path in parallel with the inverter feed path to supply a second amount of power to the load based at least in part on a second command; and
    a controller to generate the first and second commands to vary the first amount of power and the second amount of power based at least in part on information relevant to the stability of a power source that supplies the first inverter feed path or the first bypass feed path, or both, wherein the information relevant to the stability of the power source derives from at least one information provider external to the UPS system, wherein the controller is configured:
        when the information relevant to the stability of the power source indicates that a likelihood of a power supply disturbance is within an allowable likelihood, to generate the first and second commands based at least in part on whether an electrical measurement of power flowing through the uninterruptible power supply is outside a first limit; and
        when the information relevant to the stability of the power source indicates that the likelihood of the power supply disturbance is not within the allowable likelihood, to generate the first and second commands based at least in part on whether the electrical measurement of power flowing through the uninterruptible power supply is outside a second limit more protective than the first limit.

2. The system of claim 1, wherein the information relevant to the stability of the power source comprises a current weather alert, a weather forecast, historical weather data, a news event, an indication of a scheduled power outage, an indication of currently unexpected demand, historical demand data, or network traffic over a power line data network, or any combination thereof.

3. The system of claim 1, wherein the controller comprises a network connection coupled to the information provider, wherein the information provider comprises a meteorological service, a news service, a utility provider, or a power source stability rating service, or any combination thereof.

4. The system of claim 1, wherein the controller is configured to:
    detect when a local power supply disturbance occurs based at least in part on an electrical measurement of power flowing through the uninterruptible power supply;
    when the local power supply disturbance is detected to have occurred, request the information relevant to the stability of the power source from the at least one information provider; and
    when the information relevant to the stability of the power source is indicates the local power supply disturbance is related to an event external to the UPS, generate the first and second commands in a manner that offers more protection to the load.

5. The system of claim 1, wherein the controller is configured, when the information relevant to the stability of the power source indicates that a likelihood of a power supply disturbance is beyond the allowable likelihood, to cause the controller to generate the first and second commands so as to increase the first amount of power and decrease the second amount of power.

6. The system of claim 1, wherein the controller is configured to generate the first and second commands based at least in part on a rating of the stability of the power source, wherein the rating is determined by a computing device external to the UPS system based at least in part on the information relevant to the stability of the power source.

7. The system of claim 1, comprising an electronic agent to:
    receive the information relevant to the stability of the power source from the at least one information provider; and
    when the information relevant to the stability of the power source indicates that a likelihood of a power supply disturbance is within the allowable likelihood, provide a control signal to the controller to cause the controller to operate in the more protective mode.

8. The system of claim 7, wherein the electronic agent is a component of the controller.

9. The system of claim 7, wherein the electronic agent is configured to receive the information relevant to the stability of the power source with the at least one information provider via HTTP, HTTPS, RSS, XML, Atom syndication, SOAP, Ajax, SOAP over SMTP, or any combination thereof.

10. The system of claim 1, wherein the controller comprises a processor and one or more tangible, machine-readable media at least collectively comprising machine-executable instructions, wherein the processor is configured to execute the instructions, the instructions comprising:
    instructions to receive the information relevant to the stability of the power source that derives from the at least one information provider external to the UPS system;
    instructions to estimate a likelihood of a power supply disturbance in the UPS system based at least in part on the information relevant to the stability of the power source; and
    instructions to cause the UPS system to operate in a more protective mode when the likelihood of the power supply disturbance exceeds an allowable likelihood and in a less protective mode when the likelihood of the power supply disturbance does not exceed the allowable likelihood.

11. The system of claim 1, wherein the controller is configured to:
    cause the UPS to operate in a first mode when the information relevant to the stability of the power source indicates a first likelihood of disturbances; and
    cause the UPS to operate in a second mode when the information relevant to the stability of the power source indicates a second likelihood of disturbances, wherein the second likelihood of disturbances is higher than the first likelihood of disturbances and the second mode is more protective than the first mode.

12. An article of manufacture comprising:
    one or more tangible, machine-readable media at least collectively comprising machine-executable instructions, the instructions comprising:
        instructions to receive information relevant to a stability of a power source that supplies power to at least one uninterruptible power supply (UPS), wherein the information relevant to the stability of the power source derives from at least one information provider located off-site from the at least one UPS;

instructions to estimate a likelihood of a power supply disturbance in the at least one UPS based at least in part on the information relevant to the stability of the power source; and instructions to cause the at least one UPS to operate in a more protective mode when the likelihood of the power supply disturbance exceeds an allowable likelihood, wherein the instructions to cause the at least one UPS to operate in a more protective mode comprise instructions to cause the at least one UPS to more evenly distribute power supplied in parallel by multiple individual UPS s comprised by the at least one UPS.

13. The article of manufacture of claim 12, wherein the instructions to receive the information relevant to the stability of the power source comprise instructions to receive a numeric code that indicates a weather condition or forecast from a remote server.

14. The article of manufacture of claim 12, wherein the instructions to receive the information relevant to the stability of the power source comprise instructions to receive a textual indication of a weather condition or forecast from a remote server and instructions to parse the textual indication to identify the weather condition or forecast.

15. The article of manufacture of claim 14, wherein the textual indication of the weather condition or forecast comprises data in plain text format, encoded text format, the XML format, or the JSON format, or any combination thereof.

16. The article of manufacture of claim 12, wherein the instructions to cause the at least one UPS to operate in a more protective mode comprise instructions to cause the at least one UPS to supply more power through at least one inverter feed path that provides multiple-conversion power and less power through at least one bypass feed path that supplies power from the power source substantially without conversion.

17. The article of manufacture of claim 12, wherein the instructions to cause the at least one UPS to operate in a more protective mode comprise:

instructions to set a period of time to remain in the more protective mode;

instructions to receive information relevant to a stability of a power source that supplies power to at least one uninterruptible power supply (UPS) at another time;

instructions to estimate a likelihood of a power supply disturbance in the at least one UPS based at least in part on the information relevant to the stability of the power source received at the other time; and instructions to add to the period of time to remain in the more protective mode when the likelihood of the power supply disturbance exceeds the allowable likelihood and in a less protective mode when the likelihood of the power supply disturbance does not exceed the allowable likelihood.

18. A method for controlling a multimode uninterruptible power supply (UPS) that receives power from a power grid, the method comprising:

causing the UPS to operate in a first mode when information relevant to the stability of the power grid indicates a first likelihood of disturbances, wherein the information relevant to the stability of the power grid derives from at least one information provider remote from the UPS; and causing the UPS to operate in a second mode when the information relevant to the stability of the power grid indicates a second likelihood of disturbances, wherein the second likelihood of disturbances is higher than the first likelihood of disturbances and the second mode is more protective than the first mode;

wherein causing the UPS to operate in the first mode comprises causing the UPS to supply more power via a bypass feed path of the UPS than an inverter feed path of the UPS and wherein causing the UPS to operate in the second mode comprises causing the UPS to supply more power via the inverter feed path of the UPS than the bypass feed path of the UPS.

19. The method of claim 18, wherein the information relevant to the stability of the power grid comprises a weather condition or forecast that indicates the first likelihood of disturbances when the weather condition or forecast is not severe and that indicates the second likelihood of disturbances when the weather condition or forecast is severe.

* * * * *